No. 717,578. PATENTED JAN. 6, 1903.
J. S. HOWELL.
CULTIVATOR.
APPLICATION FILED APR. 3, 1902.
NO MODEL. 2 SHEETS—SHEET 1.

Witnesses:
George M. Anderson
R. A. Boswell

John S. Howell,
Inventor
by E. W. Anderson
his Attorney.

No. 717,578. PATENTED JAN. 6, 1903.
J. S. HOWELL.
CULTIVATOR.
APPLICATION FILED APR. 3, 1902.
NO MODEL. 2 SHEETS—SHEET 2.
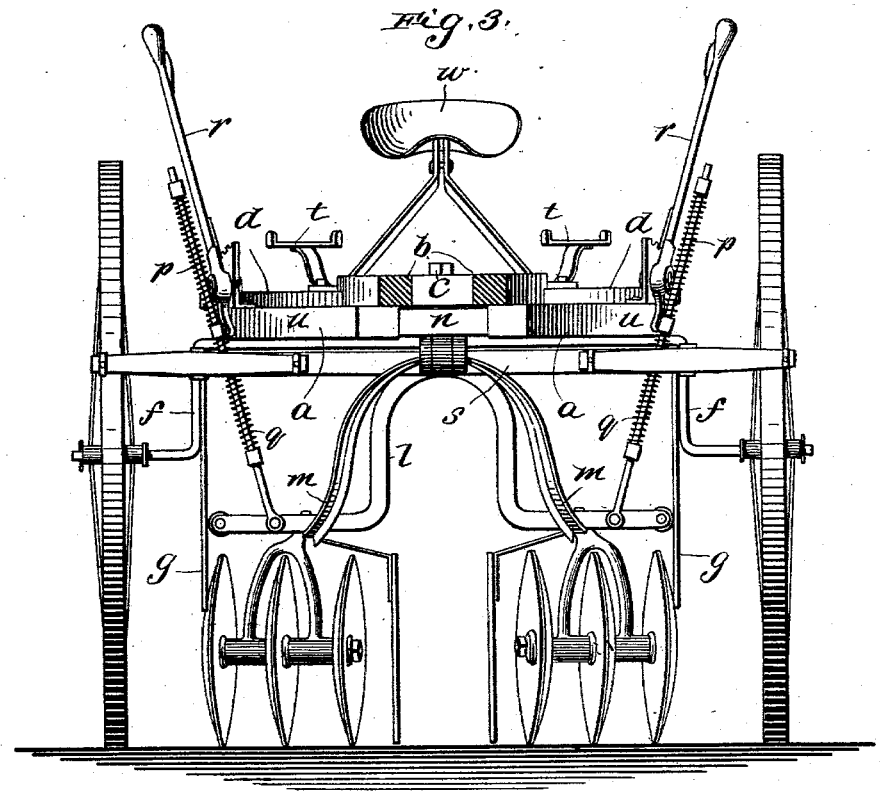
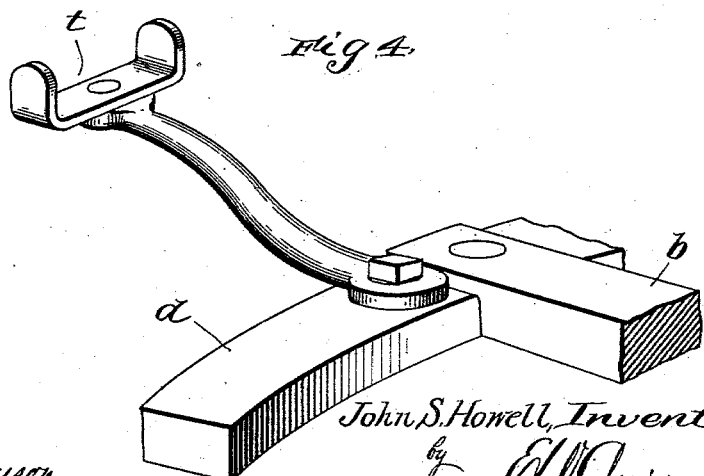
Witnesses:
George M. Anderson
R. A. Boswell
John S. Howell, Inventor:
by E. W. Anderson
his Attorney.

UNITED STATES PATENT OFFICE.

JOHN SPAHR HOWELL, OF OSCALOOSA, ILLINOIS.

CULTIVATOR.

SPECIFICATION forming part of Letters Patent No. 717,578, dated January 6, 1903.

Application filed April 3, 1902. Serial No. 101,241. (No model.)

*To all whom it may concern:*

Be it known that I, JOHN SPAHR HOWELL, a citizen of the United States, and a resident of Oscaloosa, in the county of Clay and State of Illinois, have made a certain new and useful Invention in Cultivators; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1:
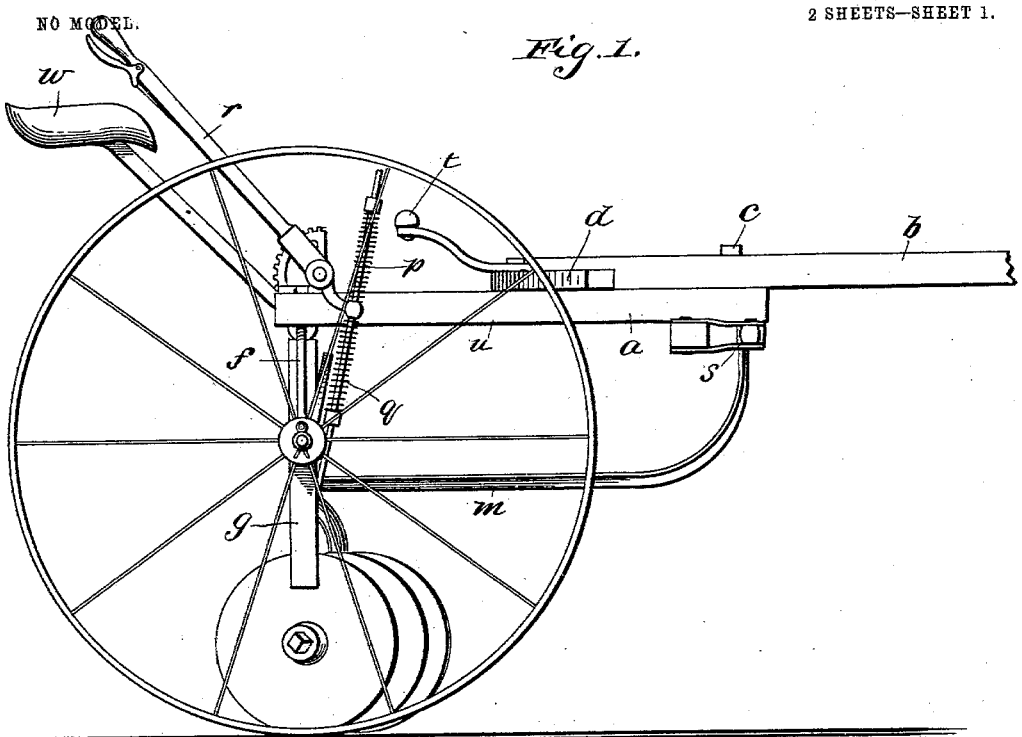
Figure 2:
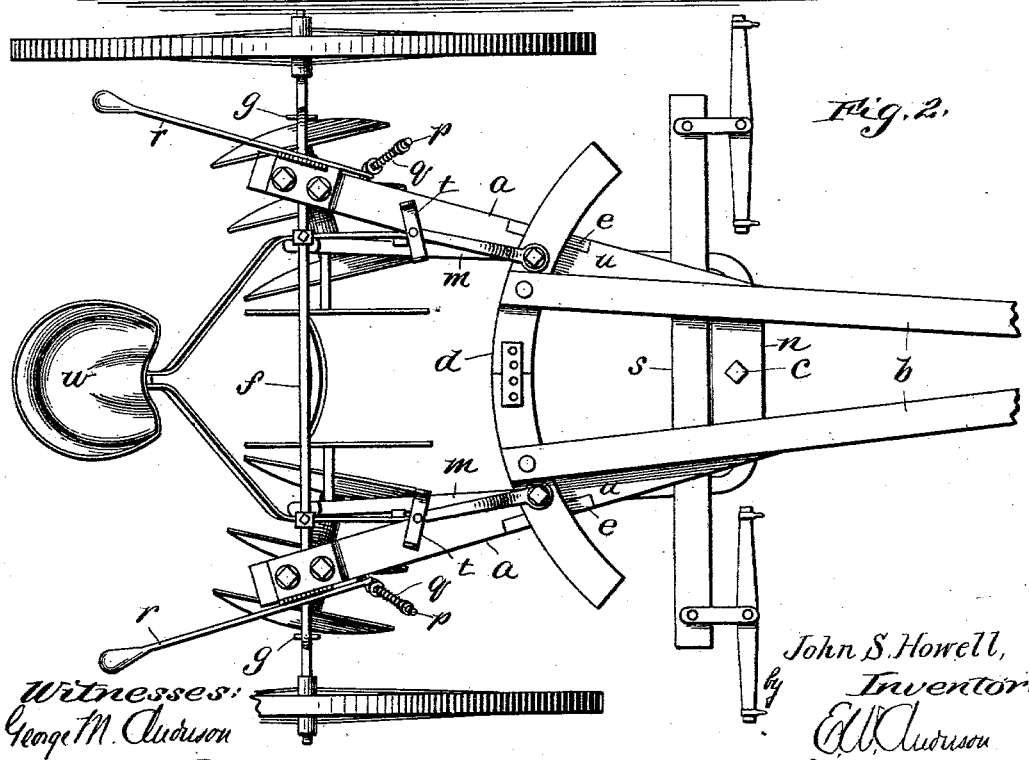

Figure is a side elevation of my invention as applied. Fig. 2 is a plan view of the same. Fig. 3 is a front elevation of the same. Fig. 4 is a detail view of one of the footholds $t$.

The invention relates to cultivators; and it consists in the novel construction and combinations of devices, as hereinafter set forth.

The object of the invention is to economize the labor of the horses and at the same time to simplify the work of the driver, and it is designed to accomplish these ends through a mode of utilizing a draft of varying direction in a continuous manner, thereby avoiding the loss of force due to incessant checking of the team and changing its line of draft.

In the accompanying drawings the letter $a$ designates the main frame of the cultivator, which is pivoted to the draft-pole $b$ by means of a bolt $c$, the two parts $b$ and $a$ being held level with each other by means of a transverse segment-bar $d$, secured to the pole and working in slide-bearings $e$ of the main frame in rear of the pivot-bolt. The arched axle (indicated at $f$) is provided with vertical bearing-plates $g$, secured to its arms and facing inward. The forward ends of the rearwardly-diverging cultivator-beams are pivoted to the front of the main frame, which is usually constructed with a cast-iron front plate $n$, through which the pivot-bolt of the draft-pole passes. The ends of the supporting-bar $l$ are attached to connecting-rods $p$, which are provided with spring-cushions $q$ and are pivoted to the ends of the adjustment-levers $r$. The doubletree $s$ is connected to the rear of the pole, usually by the kingbolt $c$. The rear end of the pole is provided with footholds or pressure-seats $t$, whereby the action on the fulcrum-pole is secured during a constantly-acting draft force by the driver, whose feet are designed to engage said seats. The main bars $u$ of the main frame diverge from the front plate, to which they are secured, toward the rear and are attached to the arched axle, near the ends thereof, so that they are out of the way and permit the free movement of the bottom frame with reference to the draft. The improved draft is designed to be serviceable especially in connection with a disk cultivator; but it may be employed in connection with shovel-cultivators of various kinds.

The cultivator-beams having been adjusted by means of the supporting-bar to take evenly in the soil or to plow more deeply on one side, the driver upon the seat $w$ sets the team in motion and having in hand levers to operate can guide the horses to much advantage, keeping them more easily in the proper line of draft. Swerving of the draft is, however, a constant occurrence, and the driver instead of checking the draft to bring the team to position simply operates through the leverage afforded by the draft-pole and by means of the footholds of the segment-bar, with his body in the seat, to guide and keep the lower main frame and its connected cultivator-beams in the proper line of work. In this operation the strain of the draft remains constant and the strength of the horses is economized. The cultivator disks or plows are kept in proper position with reference to the lower frame by means of the vertical bearing-plates and the end rollers of the pressure-bar engaging the same, so that there is no liability to loose lateral deviation in the work of said disks or plows. The driver can keep the cultivator correctly steadily working on the row even though one of the horses may be walking on it. So, also, he can plow one side of the row, the plows of the other side being adjusted to remain out of the ground, or the two sides of the cultivator can be adjusted for even plowing.

Having described this invention, what I claim, and desire to secure by Letters Patent, is—

In a cultivator, the combination of the main frame, having the arched axle, a cultivator-frame having a transverse supporting-bar provided with end rollers, and forwardly-extending rearwardly-diverging beams connected at the rear to said supporting-bar, and having a forward pivotal connection with the main frame, connecting-rods, and adjusting-levers connected through the medium thereof to the end portions of said supporting-bar, vertical bearing-plates connected to vertical arms of said axle, and in line with said supporting-bar, the tongue pivoted to the front of the main frame, and having the rear transverse segment-bar, the slide-bearings, and the footholds of the segment-bar, substantially as specified.

In testimony whereof I affix my signature in presence of two witnesses.

JOHN SPAHR HOWELL.

Witnesses:
WILLIAM WESLEY SPEAKS,
MORGAN LOUIS SABIN.